United States Patent Office 3,810,969
Patented May 14, 1974

3,810,969
PROCESS FOR THE PRODUCTION OF
CHLORINE DIOXIDE
Allan A. Schlumberger, Williamsville, N.Y., assignor to
Hooker Chemical Corporation, Niagara Falls, N.Y.
No Drawing. Filed June 22, 1971, Ser. No. 155,659
Int. Cl. C01b 11/02, 11/12
U.S. Cl. 423—478                    6 Claims

ABSTRACT OF THE DISCLOSURE

A process is described for preparing substantially pure chloric acid by reacting a metal chlorate salt with a cation exchange resin. The chloric acid is subsequently reduced to produce chlorine dioxide.

BACKGROUND OF THE INVENTION

Prior art methods for producing chloric acid include treating barium chlorate with sulfuric acid to precipitate barium sulfate and produce a dilute aqueous solution of chloric acid which was concentrated by evaporation of water under partial vacuum. This technique required complex operating manipulations and required special procedures for barium chlorate preparation such as by conversion of barium sulfate to barium chloride and then to barium chlorate.

Another prior art technique involved the precipitation of sodium sulfate decahydrate from aqueous solution of sodium chlorate and sulfuric acid by cooling the solution below about —7° C. The resulting aqueous solution of chloric acid containing remaining sodium sulfate values was suitable for use in most general applications for chloric acid. However, the cost of operating refrigeration equipment is sufficiently great to negate practical commercial application of such processes. Furthermore, the maintenance of essential acid concentrations over rather narrow ranges to insure maximum sodium sulfate removal and to prevent sodium chlorate crystallization required very careful process control requiring constant supervision.

Chlorine dioxide is generally produced by one of the following reactions:

(a)   $2NaClO_3 + SO_2 \rightarrow 2ClO_2 + Na_2SO_4$
(b)   $2NaClO_3 + 2HCl + H_2SO_4 \rightarrow$
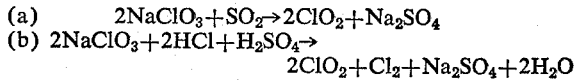
    $2ClO_2 + Cl_2 + Na_2SO_4 + 2H_2O$ In theory, chloric acid is formed in situ by reaction of the acid with sodium chlorate, and the chloric acid so produced is reduced to chlorine dioxide by the chloride or sulfite ion.

The most economical process for $ClO_2$ production by the reduction of a metal chlorate in the presence of sulfuric acid is realized when the salt cake produced is recovered from the generator effluent for use in kraft mill cooking liquors, the acid containing mother liquor being recycled back to the generator. The processes currently used perform this operation by crystallization of sodium sulfate, or sodium acid sulfate, from an effluent stream containing both sulfuric acid and sodium sulfate.

Processes have been proposed in the past which attempt to limit the amount of sodium ions in a chlorine dioxide generator by converting sodium chlorate to chloric acid chemically prior to the introduction of the chloric acid into the chlorine dioxide generator at which point the reducing agent is introduced to convert $ClO_3^-$ to $ClO_2$. All of these prior art processes involve the use of strong mineral acids to convert $NaClO_3$ to chloric acid coupled with a crystallization step for removal of sodium sulfate, to afford a chlorine dioxide generator feed material containing substantially reduced amounts of sodium ions.

BRIEF DESCRIPTION OF THE INVENTION

In accordance with this invention there is provided a process for the production of chloric acid in sufficiently high concentration to be suitable for use in any application for chloric acid, and especially for conversion to $ClO_2$, by reacting an aqueous solution containing from about 0.2 gram mole to about 11 gram moles per liter of an alkali metal chlorate with a stoichiometric excess of a cation exchange resin of the formula HR in which R represents a sulfonated styrene-divinyl benzene polymerization product, at a temperature from 5° C. to 40° C., for a time sufficient to produce an aqueous solution containing from about 0.2 gram mole to about a 4.0 gram moles solution of $HClO_3$.

The chloric acid product of the instant invention may be used in the preparation of chlorine dioxide by passing the aqueous chloric acid solution to a reactor into which is fed a conventional reducing agent. The medium for reaction in the chlorine dioxide generator may be aqueous or a strong mineral acid as is conventionally employed in chlorine dioxide generating processes. That is, such acids as HCl, $H_2SO_4$, $H_3PO_4$, $HNO_3$, and the like may form the diluent for aqueous $HClO_3$. Although the presence of an acid is not necessary in the reduction of $HClO_3$ to $ClO_2$, the presence of an acid does appear to accelerate the reaction to an extent making it advisable to operate in the presence of a strong mineral acid. In this sense, the chloric acid solution produced by the process of the instant invention may be employed in any of the various chlorine dioxide gentrating systems such as the R-2, Solvay, Mathieson, SVP, etc. processes represented by U.S. 2,510,034, U.S. 2,863,722 and U.S. 3,563,702.

The cation exchange resins that may be used effectively to remove the alkali metal chlorate cation are those ion exchange resins of sufficient capacity to withdraw metal ions from aqueous solution. The resins of special applicability are the polystyrene based resins, especially those which are copolymerized with divinyl benzene. These resins are further nuclearly sulfonated to introduce $SO_3H$ functional groups. The representative examples of such resins are Dowex 50W-X12, Amberlite IR120 and Duolite C-25.

The alkali metal chlorate solution, preferably sodium chlorate, is prepared in the desired concentration, normally approximating the molar concentration of chloric acid desired in the product, and is either slurried with the cation exchange resin batchwise or is passed through a column packed with the ion exchange resin. The amount of sodium chlorate that can be passed through a column packed with a cation exchange resin is limited by the concentration of the sodium chlorate material and the efficiency of the resin.

The technique of producing aqueous chloric acid solutions of this invention are especially adapted for providing the reactant feed materials for such chlorine dioxide generating processes as are disclosed in U.S. 3,563,702, issued Feb. 16, 1971 to Partridge et al. and in such processes as are presented in copending application, filed Jan.

22, 1971, entitled "Production of Chlorine Dioxide," Harold deV. Partridge et al.) in which latter case very dilute hydrochloric acid is employed as the mineral acid and the reducing agent for the conversion of chlorate ions to chlorine dioxide. When following the instructions of the latter process, in some situations, it is advantageous to produce dilute HCl on site at a bleach plant employing chlorine dioxide, by passing a brine solution (NaCl) through a cation exchange resin of the type disclosed in the instant application suitable for the conversion of sodium chlorate to chloric acid.

Thus, an improved process is provided for the production of chlorine dioxide and chlorine wherein an aqueous solution of chloric acid containing from about 0.2 to about 4.0 gram mole of chloric acid is reacted with from about 0.05 hydrochloric acid to about 1.9 normal in aqueous solution at a temperature from about 25 to 90° C., or up to boiling temperature of the solution at a pressure about 20 to about 400 millimeters mercury absolute. The reaction can be effected while removing from the reaction solution $ClO_2$ in admixture with a volume of water vapor sufficient to maintain a constant reaction solution volume. The reaction is preferably conducted in the presence of at least one catalyst selected from the group consisting of vanadium pentoxide, silver ions, manganese ions, dichromate ions and arsenic ions.

It is to be understood that the reduction of chloric acid may be accomplished with any conventional reducing agent such as sulfur dioxide, sulfurous acid, hydrochloric acid, methanol and formaldehyde or formic acid. In general, the reaction conditions maintained during the reduction of chloric acid to chlorine dioxide are those in which the temperature is within the range of about 20 to about 100 degrees centigrade, preferably 45 to 85 degrees centigrade, in which the aqueous solution is maintained from neutral to about 12 normal in sulfuric acid, preferably from about 2 to 6 normal in $H_2SO_4$, or from about 0.05 to about 1.9 normal in hydrochloric acid. The chlorine dioxide generation from chloric acid may be conducted at atmospheric pressure or under reduced pressures, the latter being preferably in the range from about 20 to about 400 millimeters mercury absolute.

The concentration of alkali metal chlorate contacted with the cation exchange resin is that molar concentration of chlorate ions needed to give the corresponding molar concentration of chloric acid in a effluent. Thus, alkali metal chlorate concentrations from about 0.5 to about 5 molar are operable in producing aqueous $HClO_3$ solutions from 0.5 up to the preferred upper limit for chloric acid of about 3.5 molar. The reducing agent is introduced into the chlorine dioxide generator in an amount required to effect reduction of chloric acid to chlorine dioxide. When HCl is employed as the reducing agent, about an equimolar amount of HCl to chloric acid is employed, with a slight excess of chloride ion being acceptable. That is, from 1.0 to about 1.3 moles chloride ion per mole chlorate ion. When $SO_2$ is employed as the reducing agent, about ½ mole of $SO_2$ is used for each mole of chlorate ion. When methanol is used as the reducing agent, about 0.3 to about 0.5 mole methanol are used for each mole of chlorate ion. Therefore, the range of reducing agent employed is about 0.3 to about 1.3 moles per mole of chlorate. The concentration of chlorate ions in the chlorine dioxide generator also may vary from 0.5 to about 5 molar in chloric acid.

Having described in general the method of operation of the instant invention, the following example is provided to specifically describe the preferred embodiment.

EXAMPLE 50 milliliters of 3.5 molar aqueous sodium chlorate was passed through a 100 milliliter buret filled with Amberlite IR-120 at room temperature and atmospheric pressure, to provide an aqueous solution 1.89 normal in chloric acid.

53.4 milliliters of this aqueous chloric acid solution was reacted in 50 milliliters of ten normal sulfuric acid with 9 milliliters of concentrated hydrochloric acid at 60 degress centigrade. These materials were charged into a 250 milliliter three-necked flask containing a nitrogen inlet, a thermometer and a magnetic stirrer. The hydrochloric acid (11.7 normal; —0.1 mole) was added dropwise to the chloric acid and sulfuric acid, which mixture was maintained at 60–65 degrees centigrade. Nitrogen was passed through the reaction mixture at a rate of 1148 cubic centimeters per minute. The chlorine dioxide and chlorine evolved were analyzed by absorption in 10 percent potassium iodide followed by titration with sodium thiosulfate. The mole ratio of products approximated theory, affording a near 100 percent yield.

The preceding experiment was repeated employing Dowex 50W–X12 as the ion exchange resin to afford a chloric acid solution of about 2 normal chloric acid from a sodium chlorate solution containing 3.5 moles sodium chlorate per liter. The overall results were the same as with the Amberlite resin.

21 portions, 50 milliliter each, of aqueous sodium chlorate at 3.5 molar concentration were passed through the Amberlite cation exchange resin column without any sign of exhaustion of the resin. Likewise, 14 passes were made with 50 milliliter portions of 3.5 molar sodium chlorate solution through the Dowex resin column without signs of exhaustion of the resin.

The exhausted ion exchange resins were regenerated to the acid state with 5 normal sulfuric acid. The effluent contained sodium bisulfate. The sodium bisulfate (0.1 to 3.0 molar) solution was converted to neutral anhydrous sodium sulfate by passing the bisulfate through a cation exchange resin fully in the sodium phase.

A cation exchange resin can be employed to treat sodium chloride solutions to produce HCl which may be used as the reducing agent for the chloric acid. The amount of chloride introduced into the ion exchange resin will vary with the amount of HCl needed to reduce the chlorate. Since about 1 mole HCl is needed for each mole of chloric acid to generate chlorine dioxide, equivalent amounts of sodium chloride may be passed through a cation exchange resin of the same type discussed supra, to generate HCl of the desired strength.

What is claimed is:

1. A process for the production of chlorine dioxide which comprises
   (a) reacting an aqueous solution containing from about 0.2 to about 11 gram moles per liter of an alkali metal chlorate with a cation exchanging resin at a temperature from about 5° C. to about 40° C. for a time sufficient to produce an aqueous solution containing from about 0.2 to about 4.0 gram moles of $HClO_3$ per liter;
   (b) reacting said $HClO_3$ with a reducing agent at a temperature between 25° C. to the boiling temperature of the solution at a pressure from about 20 millimeters mercury absolute to atmospheric pressure;
   (c) removing $ClO_2$ reaction product from the reaction site as it is produced.

2. The process of claim 1 in which the reaction of $HClO_3$ with a reducing agent is conducted at a temperature between 25 to 90° C. at a pressure from about 20 to about 400 millimeters mercury absolute, while removing from the reaction solution $ClO_2$ in admixture with a volume of water vapor sufficient to maintain a constant reaction solution volume.

3. The process of claim 1 in which said reducing agent is the chloride ion.

4. The process of claim 3 in which the reaction of a chloride with $HClO_3$ is conducted in the presence of a least one catalyst selected from the group consisting of vanadium pentoxide, silver ions, manganese ions, dichromate ions and arsenic ions.

5. The process of claim 4 in which said catalyst is the silver ion.

6. The process of claim 1 in steps (b) in which the reaction is performed in the presence of a strong mineral acid medium.

References Cited

UNITED STATES PATENTS

| | | | |
|---|---|---|---|
| 3,684,437 | 8/1972 | Callerame | 423—477 |
| 2,344,346 | 3/1944 | Evans | 23—152 |
| 2,376,935 | 5/1945 | Persson | 23—152 |
| 2,484,402 | 10/1949 | Day et al. | 23—152 |
| 2,811,420 | 10/1957 | Pernert | 23—152 |
| 2,863,722 | 12/1958 | Rapson I | 23—152 |
| 2,881,052 | 4/1959 | Julien et al. | 23—152 |
| 2,936,219 | 5/1960 | Rapson II | 23—152 |
| 3,107,147 | 10/1963 | Hirschberg | 23—152 |
| 3,563,702 | 2/1971 | Partridge et al. | 23—152 |
| 3,585,147 | 6/1971 | Gordon | 23—152 |

FOREIGN PATENTS

| | | | |
|---|---|---|---|
| 791,680 | 3/1958 | Great Britain | 23—152 |

EDWARD STERN, Primary Examiner

U.S. Cl. X.R.

423—472, 475